(12) United States Patent
Ohsawa et al.

(10) Patent No.: US 7,584,931 B2
(45) Date of Patent: Sep. 8, 2009

(54) CASE HOLDING MECHANISM

(75) Inventors: Hiroyasu Ohsawa, Hamamatsu (JP);
Kazuya Matsuura, Hamamatsu (JP);
Takashi Sakagami, Hamamatsu (JP);
Kouichi Ikuma, Hamamatsu (JP)

(73) Assignee: Toyo Roki Seizo Kabushiki Kaisha, Hamamatsu-Shi (JP)

( * ) Notice: Subject to any disclaimer, the term of this patent is extended or adjusted under 35 U.S.C. 154(b) by 484 days.

(21) Appl. No.: 11/397,635

(22) Filed: Apr. 5, 2006

(65) Prior Publication Data
US 2006/0237506 A1 Oct. 26, 2006

(30) Foreign Application Priority Data
Apr. 21, 2005 (JP) ............... 2005-123884

(51) Int. Cl.
*A47G 1/10* (2006.01)
*A45F 5/00* (2006.01)
(52) U.S. Cl. .............. 248/316.7; 220/743; 224/567; 248/309.1; 248/313; 294/33; 294/164
(58) Field of Classification Search ........... 248/309.1, 248/316.7, 112, 113, 231.85, 310, 311.2, 248/247–249, 312.1, 313, 316.1; 224/567, 224/548, 555, 570, 571, 217, 483, 32 R; 220/741, 220/743; 294/33, 32, 164, 165, 166
See application file for complete search history.

(56) References Cited

U.S. PATENT DOCUMENTS 1,664,109 A * 3/1928 Howden ............... 248/113

| 2,730,278 | A | * | 1/1956 | Sherlowsky | 220/741 |
| 2,755,977 | A | * | 7/1956 | Malcolm | 220/741 |
| 3,262,618 | A | * | 7/1966 | Miller | 294/33 |
| 4,386,721 | A | * | 6/1983 | Shimano | 224/414 |
| 5,060,832 | A | * | 10/1991 | Link | 224/414 |
| 5,426,570 | A | * | 6/1995 | Davis | 224/414 |
| 6,491,194 | B2 | * | 12/2002 | Marvin | 224/483 |
| 2006/0237506 | A1 | * | 10/2006 | Ohsawa et al. | 224/554 |
| 2008/0110889 | A1 | * | 5/2008 | Ohsawa et al. | 220/288 |

FOREIGN PATENT DOCUMENTS

JP        8-8901        3/1996

* cited by examiner

*Primary Examiner*—Amy J. Sterling
*Assistant Examiner*—Tan Le
(74) *Attorney, Agent, or Firm*—Young & Thompson

(57) ABSTRACT

A case holding mechanism includes a holding member and a member to be held thereby, one being mounted to the case and another to a body to which the case is to be held. The member to be held includes a first pair of parallel guide portions and another pair of parallel guide portions perpendicular to the one paired guide portions. The holding member disposed to be movable with respect to the guide portions therealong in a state restricted in thickness direction of the guide portions and adapted to hold the member to be held. The holding member includes a pair of slide portions slidable along outer surfaces of one paired guide portions, a lock portion extending between the paired slide portions in parallel with the one paired guide portions and engaged with the other paired guide portions, and a base portion connecting the slide portions and the lock portion.

7 Claims, 8 Drawing Sheets

CASE HOLDING MECHANISM

BACKGROUND OF THE INVENTION

1. Field of the Invention

The present invention relates to a case holding mechanism or structure for holding a case of such as canister to a predetermined position.

2. Prior Art

A machinery or equipment such as canister or reserve tank having a case is mounted detachably to a vehicle body by holding a hold member to be held, which is provided for one of the case and the vehicle body, to a holding member, which is provided for the other one thereof. Such mechanism is generally mounted in an engine room of a vehicle or a portion near a fuel tank, for example.

In recent years, according to an increased requirement of high performance of vehicles such as automobiles, various machineries or equipments are accommodated and arranged in an engine room, and hence, a space for mounting a case of such as canister has been reduced therein. Accordingly, it has been desired to provide an improved mechanism for holding or mounting the case without giving any adverse influence to an environmental equipments or vehicle body itself.

A prior art provides a Kokoku (examined patent publication) of Japanese Utility Model No. HEI 8-8901 (Reference 1), in which the canister case is provided, at its outer peripheral surface, with a rectangular hold member to be held. This hold member has opposing outer edge portions formed so as to be tapered. That is, the outer edge portions of the hold member to be held is tapered with respect to the perpendicularly intersecting two directions. On the other hand, the holding member has both side edge portions to which engaging portions to be engaged with the hold member to be held by the holding member are formed. These engaging portions are also formed to be tapered so as to be engageable with the outer edge of the hold member to be held.

According to such structure, in the holding mechanism disclosed in the Reference 1, the canister can be mounted with respect to the perpendicular two directions of a vehicle body.

However, in the holding mechanism of the Reference 1, the engagement is performed by utilizing the tapered structure, so that after the mounting, there is a fear for the engaged portion to be loosened in lapse of time, thus being inconvenient and disadvantageous.

SUMMARY OF THE INVENTION

Therefore, the present invention was conceived to substantially eliminate defects or drawbacks encountered in the prior art mentioned above and an object of the present invention is to provide a case holding mechanism capable of mounting the case in at least two directions firmly for a long time.

This and other objects can be achieved according to the present invention by providing a case holding mechanism having a holding member and a member to be held by the holding member, one of which is mounted to the case and another one of which is mounted to a body to which the case is to be held, the case holding mechanism comprising:

a member to be held which is formed with a pair of guide portions extending in parallel with each other and another pair of guide portions extending in parallel with each other, the one and another paired guide portions being perpendicular to each other; and a holding member disposed to be movable with respect to the guide portions therealong in a state restricted in thickness direction of the guide portions and adapted to hold the member to be held, the holding member including a pair of slide portions slidable along outer surfaces of the one paired guide portions, a lock portion extending between the paired slide portions in parallel with the one paired guide portions and engaged with the another paired guide portions, and a base portion connecting the slide portions and the lock portion, the lock portion being provided with an engaging portion protruded toward the member to be held at a position corresponding to either one of the another one paired guide portions.

In a preferred embodiment of the above aspect of the present invention, it may be desired that each of the guide portions is formed with a guide surface protrude in the thickness direction thereof and a constraint portion protrude outward of the member to be held at a front end of the guide surface in the thickness direction, and the slide portion is slid along a slit formed between the constraint portion and the case.

The another paired guide portions perpendicular to the one paired guide portions guiding the holding member may be desired to serve as stopper portion stopping the sliding motion of the holding member by rendering the slide portion or base portion of the holding member to abut against the member to be held.

It may be also desired that the holding member has the base portion and the body portion in the sliding direction with respect to the member to be held, the body portion has a protruded portion protruded from the base portion toward the member to be held by the holding member, the slide portion is formed to the body portion, and the body portion and the lock portion are formed to be parallel with each other with a distance corresponding to a thickness of the constraint portion.

According to the present invention of the characters mentioned above, the case of a canister, for example, can be mounted at two directions perpendicular to each other and to be slidable in the directions.

The nature and further characteristic features of the present invention will be made more clear from the following descriptions made with reference to the accompanying drawings.

DESCRIPTION OF THE PREFERRED EMBODIMENT

A preferred embodiment of the present invention will be described hereunder with reference to the accompanying drawings. In the following descriptions, terms of "upper", "lower", "right", "left" and the like terms are used with reference to the illustration on the drawings or generally usable state of a canister.

Figure 1:
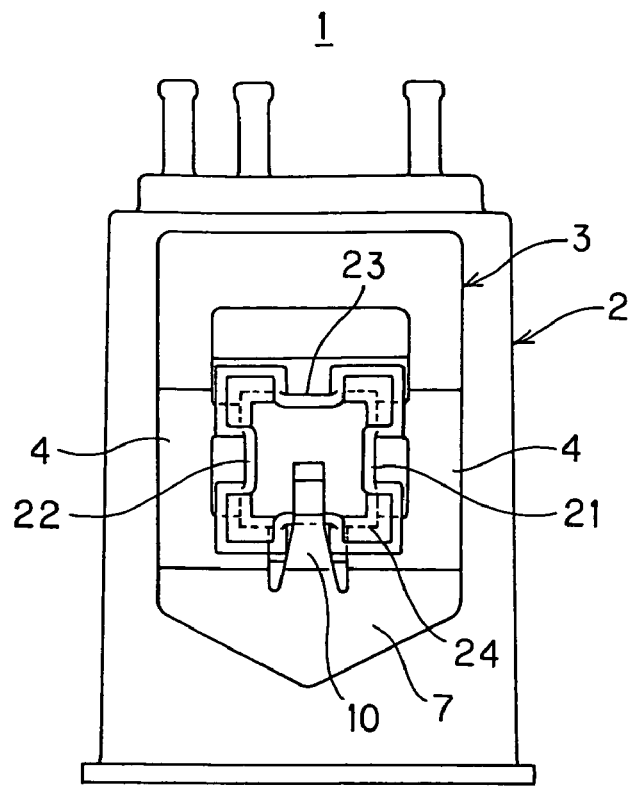
FIG. 1 is an illustrated front view of a canister unit on which a case holding mechanism according to a first embodiment of the present invention is mounted on a front side.
Figure 2:
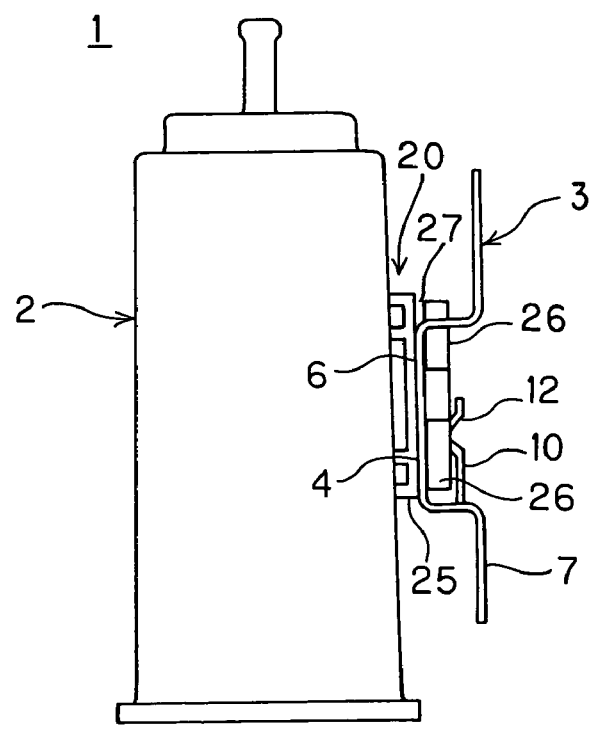
FIG. 2 is an illustrated side view of the canister unit of FIG. 1 viewed from the side thereof.

FIGS. 1 and 2 shows a case 2 of a canister 1 to which a case holding mechanism according to the first embodiment of the present invention is mounted, and as shown in FIGS. 1 and 2, the case holding mechanism includes a member 20 to be held formed on the side surface of the case 2 and a holding member 3 holding the member 20 to be held (the member to be held may be described as "hold member" or "held member" hereinafter).

The holding member 3 will be described hereunder in detail with reference to FIGS. 3 and 4.

The holding member 3 is formed through punching working and bending working from a plate member so as to provide with a base portion 7, a body portion 4, and a front end portion 14. The body portion 4 has a first bent portion formed at a boundary portion of the base portion 7 and a second bent portion 13 formed apart from this first bent portion on the front end portion side by a predetermined distance. A portion between these bent portions 12 and 13 protrudes leftward as viewed in FIG. 4 as protruded portion 6.

The body portion 4 of the holding member 3 has a central portion punched out as central space A into which the hold member 20 is to be fitted. The side portions of the holding member 3 are formed to be hence parallel at the body portion 4.

The inner edge side portions of the body portion 4 have slide portions 5 which project centrally in the space A so as to oppose to each other. These slide portions 5 are formed at the protruded portion 6 near the second bent portion 13.

Figure 3:
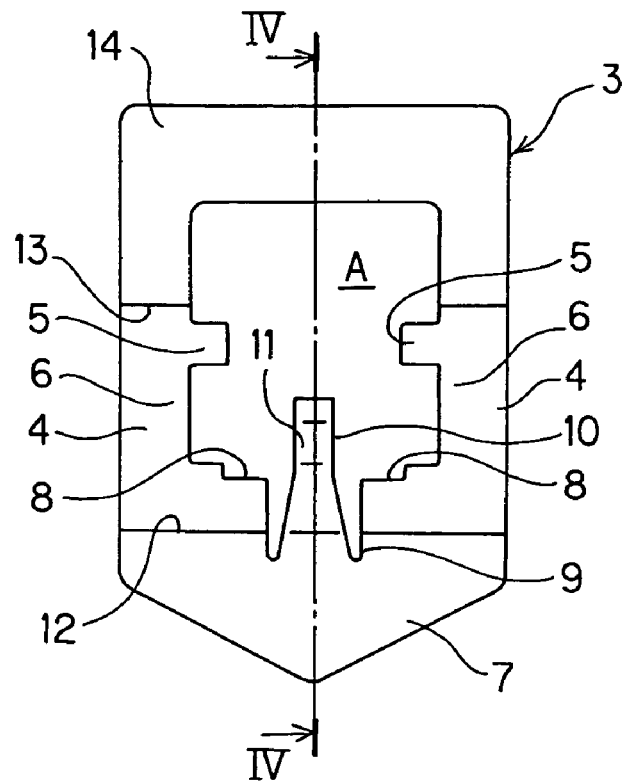
FIG. 3 is an illustration of a front view of the holding member constituting the case holding mechanism shown in FIG. 1.

Furthermore, as is apparent from FIG. 3, the holding member 3 has a lock portion 10 extending in parallel with the body portion 4 at the central portion thereof in the lateral direction. An inner edge portion of the base portion 7 is formed with a recessed portion 9 extending in an outward direction of the base portion 7, and the lock portion 10 extends from this recessed portion in the direction along which the body portion extends upwards as shown in FIG. 3.

The lock portion 10 has a vertically elongated trapezoidal shape having a tapered front end in a plan view, and the lock portion 10 has a front end extending to approximately the central portion of the protruded portion 6, the front end being formed with an engaging portion 11 extending in the thickness direction of the body portion. The portion to which the engaging portion 11 is formed corresponds to a guide portion on the base portion (7) side at a time when the hold member 20 are held, which is described in detail hereinlater. The lock portion 10 also extends, as shown in FIG. 4, in the thickness direction with a predetermined distance to be parallel with the body portion 4.

Figure 4:
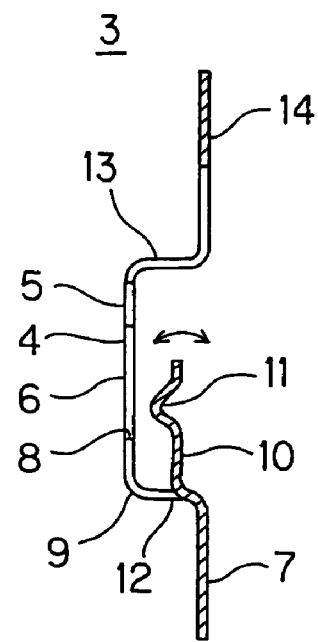
FIG. 4 is a sectional view taken along the line IV-IV.

The plate member constituting the holding member 3 has an elasticity, and accordingly, the front end portion of the lock portion 10 is elastically deformable in the thickness direction of the holding member 3 from the base portion 7 (as shown in FIG. 4 with double arrows).

Figure 5:
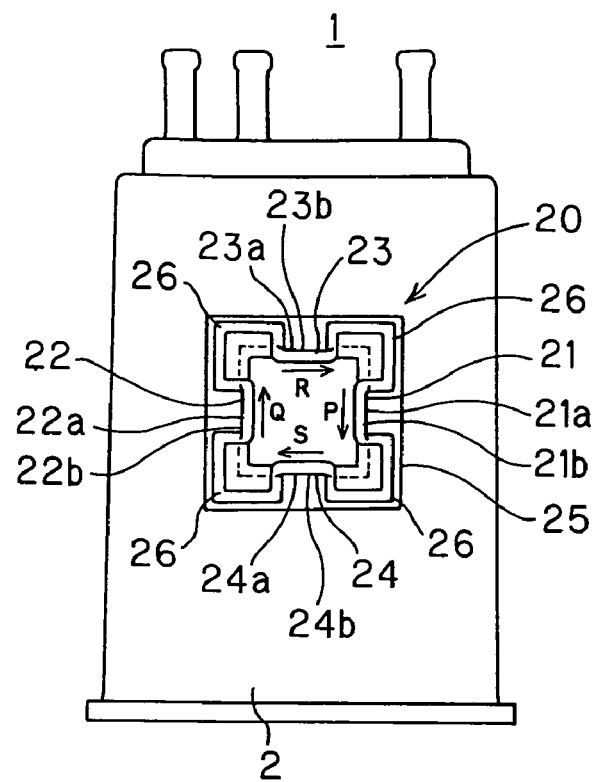
FIG. 5 is an illustrated front view of a hold member to be held (held portion) constituting the case holding mechanism shown in FIG. 1.
Figure 6:
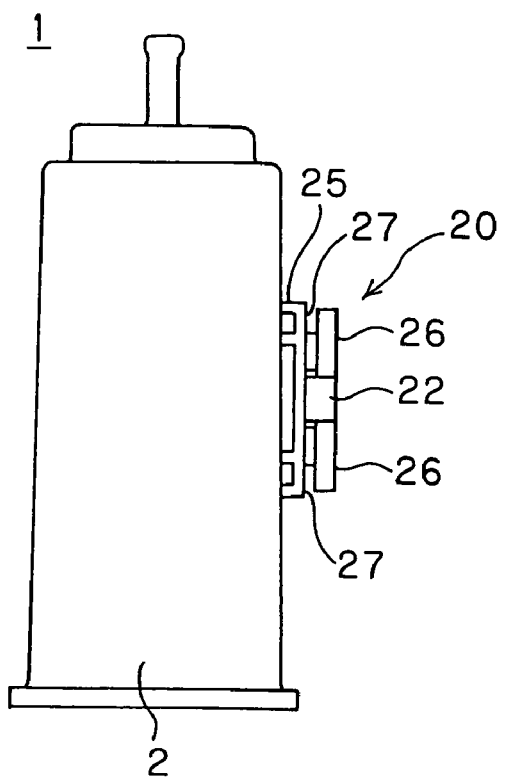
FIG. 6 is an illustrated side view of the hold member to be held shown in FIG. 5.
Figure 7:
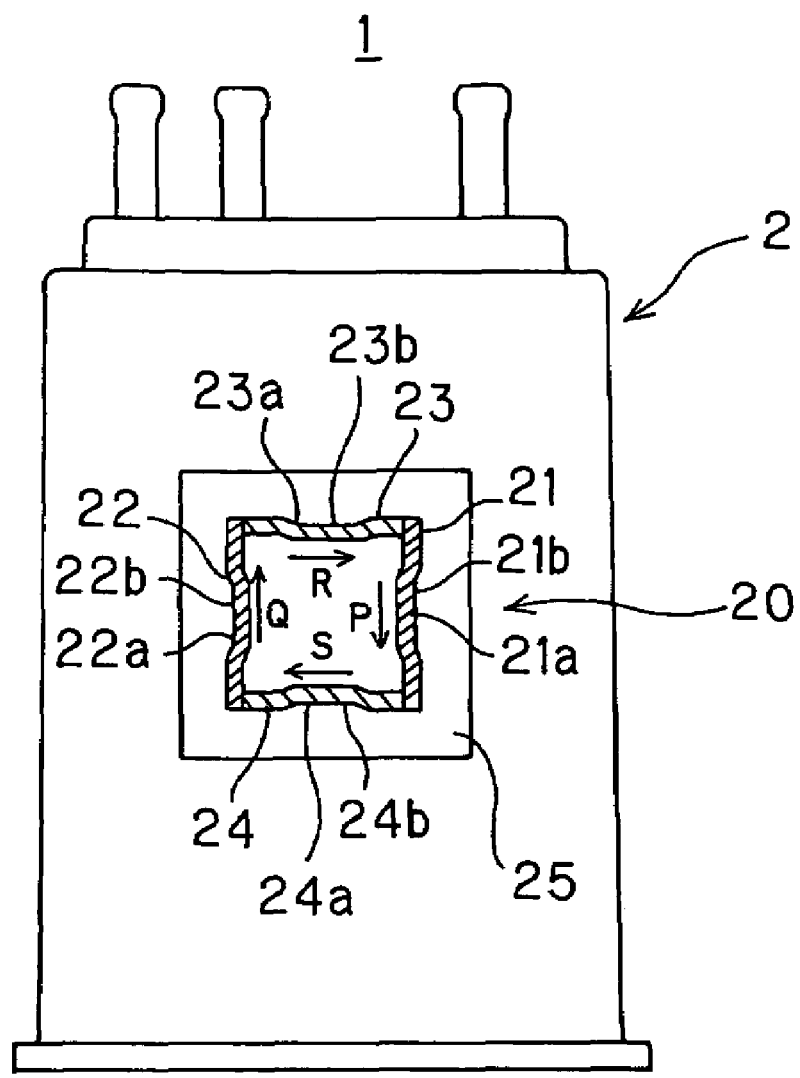
FIG. 7 is an illustrated front view of the case holding mechanism shown in FIG. 5 from which the hold member portion is removed.

The member 20 to be held (hold member or held member 20) will be then described hereunder with reference to FIGS. 5 to 7.

The hold member 20 includes two sets of guide portions 21, 22, 23 and 24. The hold member 20 has a rectangular seat portion 25 protruded with a predetermined thickness from the outer peripheral surface of the case, and the guide portions 21 to 24 are protruded, each in square shape, from the upper surface of the seat portion with a predetermined height and thickness. Constraint portions 26 are formed to the four apex portions of the respective guide portions 21 to 24 so as to protrude outward of the hold (held) member 20 from the upper ends in the height directions of the guide portions 21 to 24, respectively. Each constrain portion 26 has a thickness corresponding to a distance formed between the lock portion 10 and the protruded portion 6. A slit- 27 is defined between the seat portion 25 and the constraint portion 26 on the outer surface side of each of the guide portions 21 to 24. The outer surfaces of the respective guide portions 21, 22, 23 and 24 serve as guide surfaces 21a, 22a, 23a and 24a for guiding the body portion 4.

The guide portions constitute two pairs 21, 22 and 23, 24 as shown in FIG. 5, in which the guide portions constituting each pair are positioned in parallel with each other. Since the respective guide portions 21, 22, 23 and 24 have square shape, the one pair of guide portions 21, 22 are perpendicular to the other one pair of guide portions 23, 24.

Furthermore, as shown in FIG. 7, the central portions of the respective guide portions 21, 22, 23 and 24 are formed with recessed portions 21b, 22b, 23b and 24b by protruding the central portions slightly inward in a rectangular shape. To these recessed portions 21b to 24b, the slide portions 5 of the holding member are first fitted at the time when the hold member 20 is held to the holding member 3.

According to the structures mentioned above, the member 20 is held by the holding member 3 in the manner shown in FIGS. 1 and 2.

With the example shown in FIGS. 1 and 2, at the time when the hold member 20 to be held is mounted to the holding member 3, the recessed portions 21b and 22b formed to the guide portions 21 and 22 of the hold member 20 are coincident in their positions with the slide portions 5 formed to the holding member 3, and the hold member 20 is then pushed into the space A. Next, in the state that the inner end edges of the slide portions 5 abut against the guide surfaces 21a and 22a of the guide portions 21 and 22, the hold member 20 is slid on the base portion (7) side of the holding member 3. Then, the slide portions 5 slide between the slits formed between the constraint portion 26 on the guide portion (23) side and the seat portion 25. The inner end edge 8 of the base portion 7 is then inserted into the space between the constraint portion 26 and the seat portion 25 formed at the end of the guide portion 24 on the base (7) side.

According to such motion as described above, the guide surface 24a of the guide portion 24 on the base (7) side of a pair of guide portions 23 and 24 perpendicularly arranged with respect to the other pair of guide portions 21 and 22 guiding the sliding motion of the slid portions abuts against the inner end edge 8 of the base portion 7. That is, according to the described embodiment, the guide portion 24 itself serves as stopper member. In addition, the engaging portion 11 formed to the front end portion of the lock portion 10 rides over the guide portion 24 on the base portion side and engages with the inner surface of the guide portion 24.

In the state that the member 20 is held by the holding member 3, as mentioned above, the front end portion of the lock portion 10 is urged on the held member side with the base portion 7 being the base point, and the engaging portion 11 formed to the lock portion 10 and the inner end edge 8 of the base portion 7 clamps the guide portion 24. Furthermore, the slide portions 5 and the inner end edge 8 of the base portion 7 are restricted in their movement in the height direction by the constraint portions 26, respectively. According to such operations, the hold member 20 is firmly held by the holding member, and since the lock portion 10 is elastically deformed, the lock portion 10 serves as an urging member, thus preventing the holding state from being loosened or relaxed.

As mentioned before, the guide portions 21, 22, 23 and 24 each has a square shape, and accordingly, the hold member 20 can be held by the holding member 3 in four direction of P, Q, R and S (in FIG. 5) perpendicular to each other.

For example, when the holding member 3 is slid to the held member 20 in the P or Q direction, the holding member 3 is guided by a pair of guide portions 21 and 22, and as explained herein, when the holding member 3 is slid in the P direction, the guide portion 24 is clamped between the inner end edge 8 of the base portion 7 and the engaging portion 11 of the lock portion 10. Further, when the holding member 3 is slid in the Q direction for holding the held member 20, the guide portion 23 is clamped between the inner end edge 8 of the base portion 7 and the engaging portion 11 of the lock portion 10.

On the other hand, when the holding member 3 is slid to the held member 20 in the R or S direction, the holding member 3 is guided by a pair of guide portions 23 and 24, and when the holding member 3 is slid in the R direction, the guide portion 21 is clamped between the inner end edge 8 of the base portion 7 and the engaging portion 11 of the lock portion 10. Further, when the holding member 3 is slid in the S direction for holding the held member 20, the guide portion 22 is clamped between the inner end edge 8 of the base portion 7 and the engaging portion 11 of the lock portion 10.

In the above operation, when the holding member 3 is slid in the P or Q direction, the guide portion 23 or 24 abuts against the inner end edge 8 of the base portion 7 to thereby act as a stopper member, and on the other hand, when the holding member 3 is slid in the R or S direction, the guide portion 21 or 22 abuts against the inner end edge 8 of the base portion 7 to thereby act as a stopper member.

The second embodiment of the present invention will be described hereunder with reference to FIGS. 8 to 14.

Figure 9:
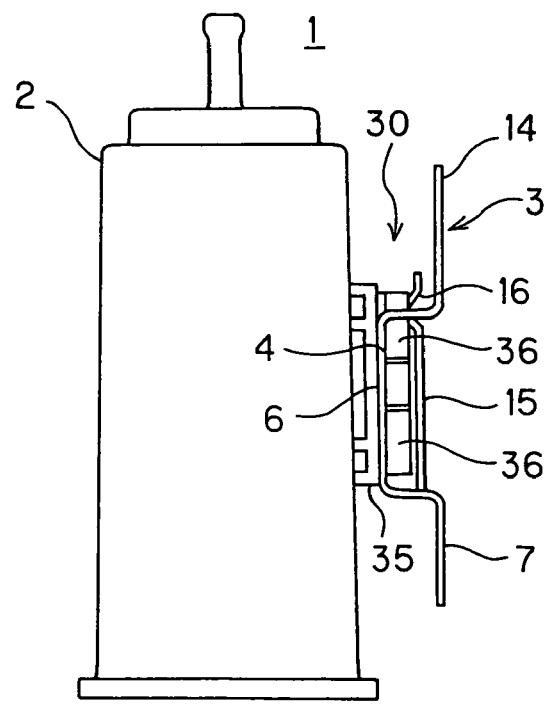
FIG. 9 is an illustrated side view of the canister unit of FIG. 8 viewed from the side thereof.
Figure 10:
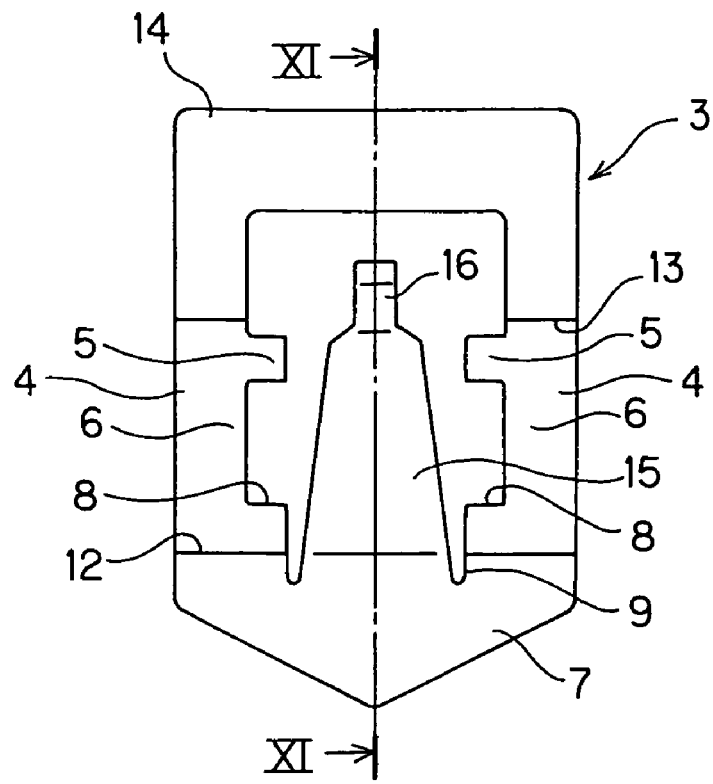
FIG. 10 is an illustration of a front view of the holding member constituting the case holding mechanism shown in FIG. 8.

As shown in FIGS. 9 and 10, the holding mechanism of the case 2 of this second embodiment includes a member 30 to be held (hold or held member 30) and the holding member 3 holding this member 30.

Figure 11:
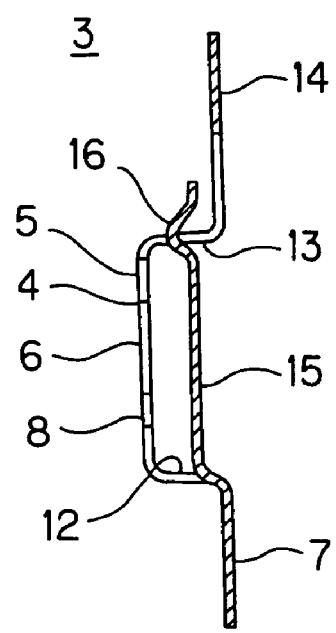
FIG. 11 is a sectional view taken along the line XI-XI.

FIGS. 10 and 11 shows the details of the holding member 3 having a structure substantially identical to that of the first embodiment, and the same reference numerals are hence added to the same portions of the second embodiment and the description thereof is omitted herein.

The lock portion 15 of this second embodiment has a fine trapezoidal shape in a plan view tapered toward the front end thereof. The distal front end of this lock portion 15 extends over the bent portion 13 toward the front end portion 14 of the holding member 3, and an engaging portion 16 is formed to the tapered front end of the lock portion 15 so as to protrude toward the body portion 4. This lock portion 15 is parallel with the body 4 from the base portion 7 at the central portion in the lateral direction of the holding member 3, and also parallel to the body portion 4 in the thickness direction with a predetermined distance as shown in FIG. 11.

Figure 12:
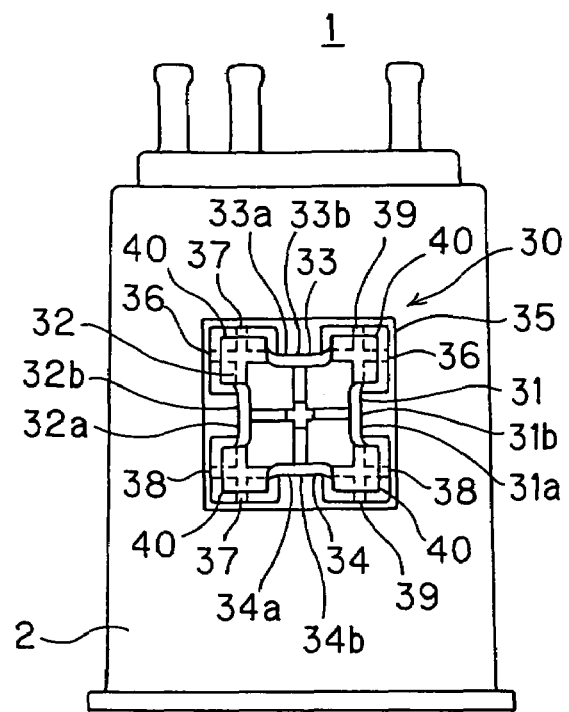
FIG. 12 is an illustrated front view of a hold member to be held (held portion) constituting the case holding mechanism shown in FIG. 8.
Figure 13:
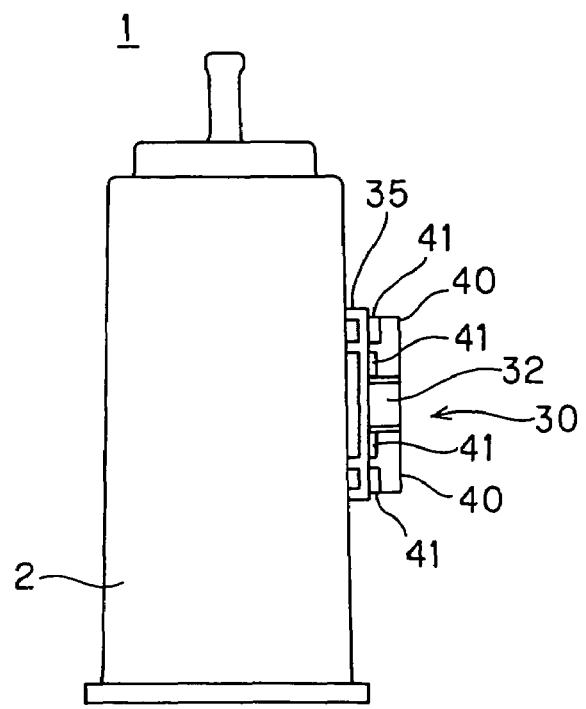
FIG. 13 is an illustrated side view of the hold member to be held shown in FIG. 12.
Figure 14:
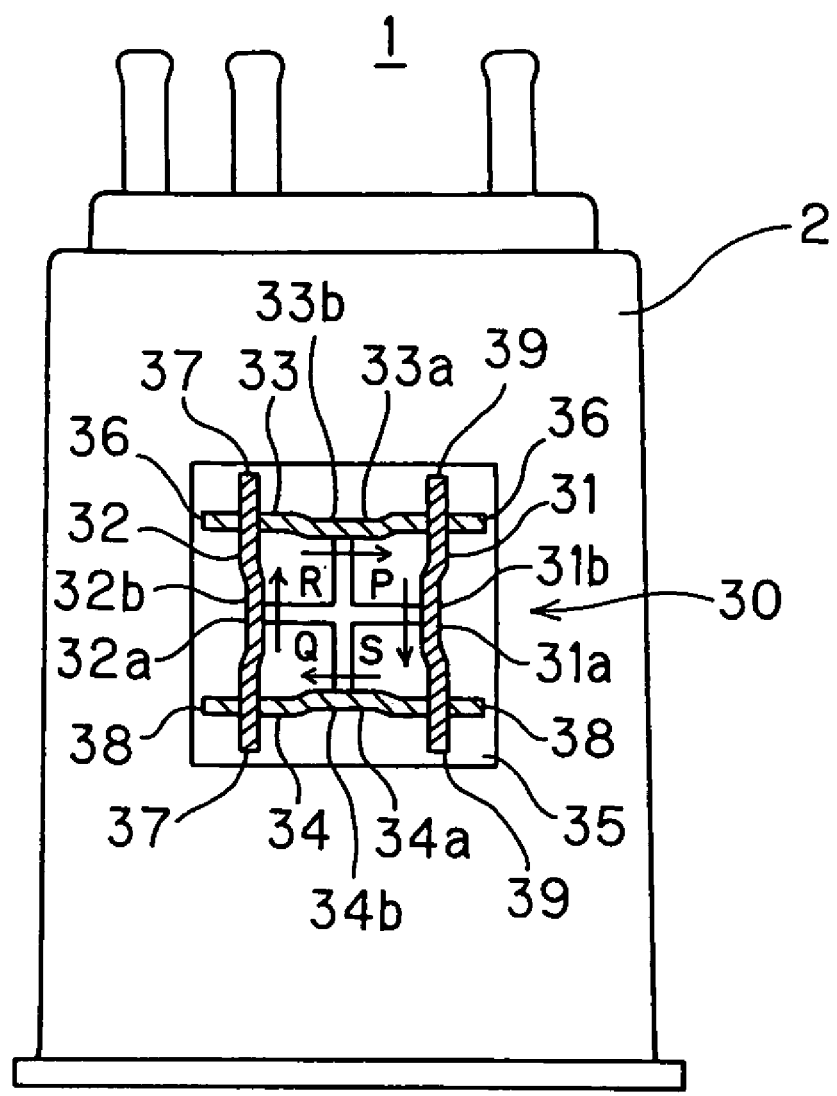
FIG. 14 is an illustrated front view of the case holding mechanism shown in FIG. 12 from which the hold member is removed.

FIGS. 12 to 14 shows the hold member 30 formed to the outer peripheral surface of the case 2 of the canister 1.

The hold member 30 has a rectangular seat portion 35 protruded from the outer peripheral surface of the case 2 with a predetermined thickness, and a pair of guide portions 31 and 32 and another pair of guide portions 33 and 34 are disposed to be crosswise in two parallels to each other in an outer appearance as shown in FIG. 14. Four constraint portions 40 are formed at four apex positions of the guide portions 31 to 34 so as to extend outward of the held member 30 from the upper end in the height direction of the guide portions 31 to 34.

With the held member 30 of this structure, as shown in FIG. 14, both ends of each of the mutually perpendicular guide portions 31, 32, 33 and 34 are formed so as to extends outward thereof and the extending portions serve as stopper members 36, 37, 38 and 39 for stopping the sliding motion of the holding member 3, which will be described hereinafter. Further, although in this embodiment, the extending portions of both the ends of the guide portions serve as stopper members, the present invention is not limited to such structure and other modification may be adopted in accordance with the shape of the holding member 3.

Furthermore, the outer surfaces of the guide portions 31 to 34 serves as guide surfaces 31a to 34a guiding the slide portions 5 of the holding member 3, and the guide portions 31 to 34 are provided with recessed portions 31b to 34b at the central portions thereof, respectively, so as to be slightly recessed inward each in a rectangular shape.

According to the structures of the holding member 3 and the hold member 30 mentioned above, the canister 1 can be held in the four directions of P, Q, R and S.

Figure 8:
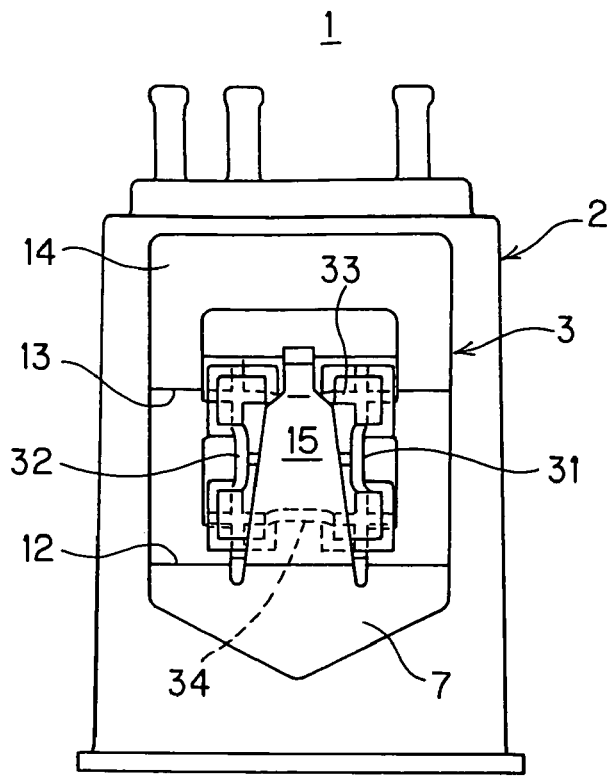
FIG. 8 is an illustrated front view of a canister unit on which a case holding mechanism according to a second embodiment of the present invention is mounted on a front side.

With the example shown in FIGS. 8 and 9, at the time when the hold member 30 (to be held) is mounced to the holding member 3, the recessed portions 31b and 32b formed to the guide portions 31 and 32 of the hold member 30 are coincident in their positions with the slide portions 5 formed to the holding member 3 and the hold member 30 is then pushed into the space A. Next, in the state that the inner end edges of the slide portions 5 abut against the guide surfaces 31a and 32a of the guide portions 31 and 32, the hold member 30 is slid on the base portion (7) side of the holding member 3. Then, the slide portions 5 slide between the slits 41 formed between the constraint portion 26 on the guide portion (33) side and the seat portion 35.

According to such motion as described above, the slide portion 5 abuts against the stopper 36 formed to the guide portion 33 on the front end (14) side of the guide portions 33 and 34 perpendicular to the guide portions 31 and 32 guiding the sliding motion of the slide portion 5. Further, the engaging portion 16 formed to the front end portion of the lock portion 15 rides over the guide portion 33 on the front end (14) side and engages with the inner surface 33a of the guide portion 33, thus establishing the engagement between the holding member 3 and the hold member 30.

In the state that the hold member 30 is held by the holding member 3, as mentioned above, the front end portion of the lock portion 15 is urged on the held member side with the base portion 7 being the base point, and the engaging portion 16 formed to the lock portion 15 and the slide portion 5 clamp the stopper 36 formed at both ends of the guide portion 33. Furthermore, the slide portions 5 are restricted in their movement in the height direction of the held member 30 by the constraint portions 26 on the guide portion (33) side. According to such operations, the hold member 30 is firmly held by the holding member 3, and since the lock portion 15 in this embodiment is also elastically deformed, the lock portion 15 serves as an urging member, thus preventing the holding state from being loosened or relaxed.

As mentioned before, according to this second embodiment, the member 30 to be held can be held by the holding member 3 in four direction of P, Q, R and S perpendicular to each other.

It is further to be noted that the present invention is not limited to the described embodiments and many other changes and modifications may be made without departing from the scopes of the appended claims.

For example, the lock portion 15 of the second embodiment having the length longer than the lock portion 10 of the first embodiment may be substituted with the lock portion 10. That is, the first embodiment may employ the lock portion 15 and the second embodiment may on the other hand employ the lock portion 10.

Furthermore, although in the above embodiments, the present invention is applied to the case of the canister, the present invention is not limited to such case and may be applied to mechanisms or like provided with cylindrical cases such as reservoir tanks of a power steering device, reserve tanks and the like.

What is claimed is:

1. A holding mechanism comprising:
    a member to be held including:
        a seat portion,
        a first pair of guide portions extending in parallel with each other and a second pair of guide portions extending in parallel with each other, said first and second paired guide pardons protruding from the seat portion and being perpendicular to each other, and
        constraint portions formed at apex positions of said first and second guide portions, respective constraint portions and said seat portion defining slits therebetween; and
    a holding member disposed to be movable with respect to the first and second guide portions therealong in a state restricted in a thickness direction of the first and second guide portions and adapted to hold the member to be held,
    said holding member including:
        a base portion,
        a pair of slide portions connected by the base portion and being passable between said constraint portions, said pair of slide portions being slidable along outer surfaces of said first paired guide portions to be inserted into said slits between respective constraint portions and the seat portion, and
        a lock portion extending from the base portion and between the paired slide portions in parallel with the first paired guide portions and engaged with the second paired guide portions, said lock portion being provided with an engaging portion protruding toward the member to be held at a position corresponding to either one of the second pair of guide portions.

2. The holding mechanism according to claim 1, wherein each of said first and second guide portions is formed with a guide surface that protrudes in the thickness direction thereof and each of said constraint portions protrudes outward of the member to be held at a front end of the guide surface in the thickness direction, and each of said slide portions is slid along a slit formed between each of the constraint portions and the seat portion.

3. The holding mechanism according to claim 1, wherein said second paired guide portions serve as a stopper portion stopping the sliding motion of the holding member by rendering the slide portion or said base portion of the holding member against the member to be held.

4. The holding mechanism according to claim 1, wherein said holding member has the base portion and the body portion in the sliding direction with respect to the member to be held, said body portion has a protruded portion protruded from the base portion toward the member to be held by the holding member, said slide portion is formed to the body portion, and said body portion and the lock portion are formed to be parallel with each other with a distance corresponding to a thickness of the constraint portion.

5. The holding mechanism according to claim 3, wherein said holding member has the base portion and the body portion in the sliding direction with respect to the member to be held, said body portion has a protruded portion protruded from the base portion toward the member to be held by the holding member, said slide portion is formed to the body portion, and said body portion and the lock portion are formed to be parallel with each other with a distance corresponding to a thickness of the constraint portion.

6. The holding mechanism according to claim 2, wherein said second paired guide portions serve as a stopper portion stopping the sliding motion of the holding member by rendering the slide portion or the base portion of the holding member against the member to be held.

7. The holding mechanism according to claim 2, wherein said holding member has the base portion and the body portion in the sliding direction with respect to the member to be held, said body portion has a protruded portion protruded from the base portion toward the member to be held by the holding member, said slide portion is formed to the body portion, and said body portion and the lock portion are formed to be parallel with each other with a distance corresponding to a thickness of the constraint portion.

* * * * *

UNITED STATES PATENT AND TRADEMARK OFFICE
CERTIFICATE OF CORRECTION

PATENT NO. : 7,584,931 B2 Page 1 of 1
APPLICATION NO. : 11/397635
DATED : September 8, 2009
INVENTOR(S) : Ohsawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this

Fourteenth Day of September, 2010

David J. Kappos
*Director of the United States Patent and Trademark Office*